(12) United States Patent
Korupolu et al.

(10) Patent No.: US 12,346,731 B2
(45) Date of Patent: Jul. 1, 2025

(54) METHOD AND SYSTEM FOR IMPLEMENTING AN AUTOMATION STACK MODULE TO MANAGE A SEEDING PROCESS

(71) Applicant: JPMorgan Chase Bank, N.A., New York, NY (US)

(72) Inventors: Sandeep Korupolu, Bangalore (IN); Ovidio Ruiz, Wharton, NJ (US); Ernie Thorkildsen, Rowland, PA (US); Xin X Zhang, Brooklyn, NY (US); Joseph Patton, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 515 days.

(21) Appl. No.: 17/662,899

(22) Filed: May 11, 2022

(65) Prior Publication Data
US 2023/0315523 A1 Oct. 5, 2023

(30) Foreign Application Priority Data

Mar. 29, 2022 (IN) .............................. 202211018328

(51) Int. Cl.
| | |
|---|---|
| *G06F 9/50* | (2006.01) |
| *G06F 8/30* | (2018.01) |
| *G06F 9/448* | (2018.01) |
| *G06F 9/455* | (2018.01) |
| *G06F 9/54* | (2006.01) |
| *G06F 8/61* | (2018.01) |

(52) U.S. Cl.
CPC ............ *G06F 9/5016* (2013.01); *G06F 8/315* (2013.01); *G06F 9/4494* (2018.02); *G06F 9/45512* (2013.01); *G06F 9/541* (2013.01); *G06F 8/61* (2013.01)

(58) Field of Classification Search
None
See application file for complete search history.

(56) References Cited

U.S. PATENT DOCUMENTS 10,135,943 B2 * 11/2018 Palandurkar .......... A63F 13/828
11,165,636 B2 * 11/2021 Hooda .................. H04L 47/788
(Continued)

*Primary Examiner* — Abu Zar Ghaffari
(74) *Attorney, Agent, or Firm* — GREENBLUM & BERNSTEIN, P.L.C.

(57) ABSTRACT

System and method for managing a seeding process are disclosed. A processor generates a table that includes parameters to be utilized for an automation process to automate the seeding process. The automation process is triggered in response to running a batch process, i.e., a mainframe batch process and identifies one specific job that has been injected into the batch process during running the mainframe batch process; develops an execution command that makes a call to a predefined algorithm written in a predefined programming language installed on an operating system; passes commands by the predefined algorithm to a copy system manager (CSM) via a CSM application programming interface; transmits a query data via a predefined formatted data to the predefined algorithm which sends the predefined formatted data back to the execution command as reformatted text; and automatically detects which site the seeding process will execute from.

11 Claims, 5 Drawing Sheets

(56) References Cited

U.S. PATENT DOCUMENTS

| | | | |
|---|---|---|---|
| 2007/0240160 A1* | 10/2007 | Paterson-Jones | G06F 8/60 718/104 |
| 2008/0319904 A1* | 12/2008 | Carlson | G06Q 20/403 705/44 |
| 2014/0129611 A1* | 5/2014 | Norris | G06F 9/547 709/202 |
| 2014/0304505 A1* | 10/2014 | Dawson | G06F 21/6227 713/165 |
| 2016/0012465 A1* | 1/2016 | Sharp | G06Q 20/321 705/14.17 |
| 2017/0063964 A1* | 3/2017 | Maltbie | H04L 67/06 |
| 2018/0284758 A1* | 10/2018 | Cella | H04L 1/18 |
| 2019/0306093 A1* | 10/2019 | Schilling | G06F 16/2455 |
| 2021/0157858 A1* | 5/2021 | Stevens | G06F 40/237 |
| 2022/0101839 A1* | 3/2022 | George | G06Q 30/016 |

* cited by examiner

METHOD AND SYSTEM FOR IMPLEMENTING AN AUTOMATION STACK MODULE TO MANAGE A SEEDING PROCESS

CROSS-REFERENCE TO RELATED APPLICATIONS

This application claims the benefit of priority from Indian Provisional Patent Application No. 202211018328, filed Mar. 29, 2022, which is herein incorporated by reference in its entirety.

TECHNICAL FIELD

This disclosure generally relates to data processing, and, more particularly, to methods and apparatuses for implementing an automation stack module configured to automatically manage a seeding process.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, monitoring, performance analysis, project tracking, and competitive analysis, to name but a few. In general, large enterprises, corporations, agencies, institutions, and other organizations are facing a continuing problem of handling, processing, and/or accurately describing a vast amount of data that are crucial to plan actions at store level or market/regional level in an efficient and expedited manner, especially during card services seeding process.

PLEX (Programming Language for EXchanges) is a special-purpose, concurrent, real-time programming language. This PLEX language may include two variants: CPPLEX used for the AXE Central Processor (CP) and Plex-M used for Extension Module Regional Processors (EMRP). CSPLEX may be a Python based web application for comparing and syncing content from and to a Plex media server. Both CPPLEX and CSPLEX may play an important role in seeding process. However, one of the major challenges a conventional data processing architecture may pose is that conventional card production seeding batch process may not be supported long term with the current E.O.L. (end-of-life) software product, IBM Peer-to-Peer Remote Copy (PPRC) and Flash Copy Manager suite. PPRC is a hardware solution which provides rapid and accurate disaster recovery as well as a solution to workload movement and device migration. Updates made on the primary DASD (direct-access storage device) volumes are synchronously shadowed to the secondary DASD volumes.

For example, conventional seeding process may utilize vendor software that is loaded on the IBM z/OS host environment. The software, IBM PPRC manager has become E.O.L. If the process breaks, software would have to be fixed in-house having no access or rights to the code. Additional to the supportability issue, the E.O.L. software also prohibits the card services application to meet any new data center criteria which would have put it at risk of migrating into the new data centers on time.

As the process is needed long term to copy database files from production CPPLEX to the necessary Stand-In environment, CSPLEX, a new solution may need to be developed to manage the card services seeding process.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic automation stack module (i.e., automated seeding processing module as disclosed herein) configured to automatically manage a seeding process (i.e., a card services seeding process, but the disclosure is not limited thereto), thereby removing risk from the environment, meeting the technology requirements without having to accept risk with a non-supported software product; increasing capability by automating the process switch during planned or unplanned Site Switch & Recovery; and allowing the CPPLEX environment to meet any new data center entry criteria to move from the old data centers to new data centers on-time, but the disclosure is not limited thereto.

According to an aspect of the present disclosure, a method for implementing an automation stack to manage a seeding process by utilizing one or more processors along with allocated memory is disclosed. The method may include: generating a table that includes parameters to be utilized for an automation process configured to automate a seeding process; triggering the automation process in response to running a batch process; identifying one specific job that has been injected into the batch process during running the batch process; developing an execution command, in response to identifying the one specific job, that makes a call to a predefined algorithm written in a predefined programming language installed on an operating system; passing commands, in response to developing the execution command, by the predefined algorithm to a CSM (copy system manager) via a network through a CSM application programming interface (API); transmitting, by the CSM, a query data via a predefined formatted data to the predefined algorithm which sends the predefined formatted data back to the execution command as reformatted text, until the automation process is completed; and automatically detecting which site the seeding process will execute from thereby maintaining the automation process on track.

According to a further aspect of the present disclosure, the method may further include: writing the automation stack in REXX (Restructured Extended Executor) programming language and wherein the formatted data is JSON (Java Script Object Notation) formatted data but the disclosure is not limited thereto these specified languages.

According to an additional aspect of the present disclosure, the execution command is a 64-bit operating system for a predefined architecture mainframe REXX execution command and wherein the predefined algorithm is a Python routine but the disclosure is not limited thereto these specified languages.

According to yet another aspect of the present disclosure, the table may be an OPS/MVS (operations/multiple virtual storage) table, and the REXX execution command may execute the following: providing values back to the OPS/

MVS table; passing data to the Python routine on tasks to operate; and re-formatting the JSON data back to an operating system text so that the OPS/MVS can identify status of steps in the automation process.

According to a further aspect of the present disclosure, the Python routine provides an interface to the CSM API advanced functioning so that CSM can operate tasks as needed by the automation process; and send the JSON formatted data back to the REXX execution command to allow for query or validation operations to occur, thereby maintaining the automation process on track.

According to an additional aspect of the present disclosure, the seeding process corresponds to card seeding process that sends a copy of IMS (Information Management System) transaction data corresponding to a card transaction to card service application's stand-in environment to keep it current in the event it has to take over transaction processing for production environment.

According to yet another aspect of the present disclosure, the batch process is a mainframe batch process.

According to an aspect of the present disclosure, a system for implementing an automation stack to manage a seeding process by utilizing one or more processors along with allocated memory is disclosed. The system may include: a processor; and a memory operatively connected to the processor via a communication interface, the memory storing computer readable instructions, when executed, may cause the processor to: generate a table that includes parameters to be utilized for an automation process configured to automate a seeding process; trigger the automation process in response to running a batch process; identify one specific job that has been injected into the batch process during running the batch process; develop an execution command, in response to identifying the one specific job, that makes a call to a predefined algorithm written in a predefined programming language installed on an operating system; pass commands, in response to developing the execution command, by the predefined algorithm to a CSM via a network through a CSM API; transmit, by the CSM, a query data via a predefined formatted data to the predefined algorithm which sends the predefined formatted data back to the execution command as reformatted text, until the automation process is completed; and automatically detect which site the seeding process will execute from thereby maintaining the automation process on track.

According to a further aspect of the present disclosure, processor is further configured to: write the automation stack in REXX programming language and wherein the formatted data is JSON formatted data.

According to yet another aspect of the present disclosure, the table may be an OPS/MVS table, and the processor may cause the REXX execution command to execute the following: provide values back to the OPS/MVS table; pass data to the Python routine on tasks to operate; and re-format the JSON data back to an operating system text so that the OPS/MVS can identify status of steps in the automation process.

According to an aspect of the present disclosure, a non-transitory computer readable medium configured to store instructions for implementing an automation stack to manage a seeding process by utilizing one or more processors along with allocated memory is disclosed. The instructions, when executed, may cause a processor to perform the following: generating a table that includes parameters to be utilized for an automation process configured to automate a seeding process; triggering the automation process in response to running a batch process; identifying one specific job that has been injected into the batch process during running the batch process; developing an execution command, in response to identifying the one specific job, that makes a call to a predefined algorithm written in a predefined programming language installed on an operating system; passing commands, in response to developing the execution command, by the predefined algorithm to a CSM via a network through a CSM API; transmitting, by the CSM, a query data via a predefined formatted data to the predefined algorithm which sends the predefined formatted data back to the execution command as reformatted text, until the automation process is completed; and automatically detecting which site the seeding process will execute from thereby maintaining the automation process on track.

According to a further aspect of the present disclosure, the instructions, when executed, may further cause the processor to perform the following: writing the automation stack in REXX programming language and wherein the formatted data is JSON formatted data.

According to yet another aspect of the present disclosure, the table may be an OPS/MVS table, and the instructions may cause the REXX execution command to execute the following: providing values back to the OPS/MVS table; passing data to the Python routine on tasks to operate; and re-formatting the JSON data back to an operating system text so that the OPS/MVS can identify status of steps in the automation process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
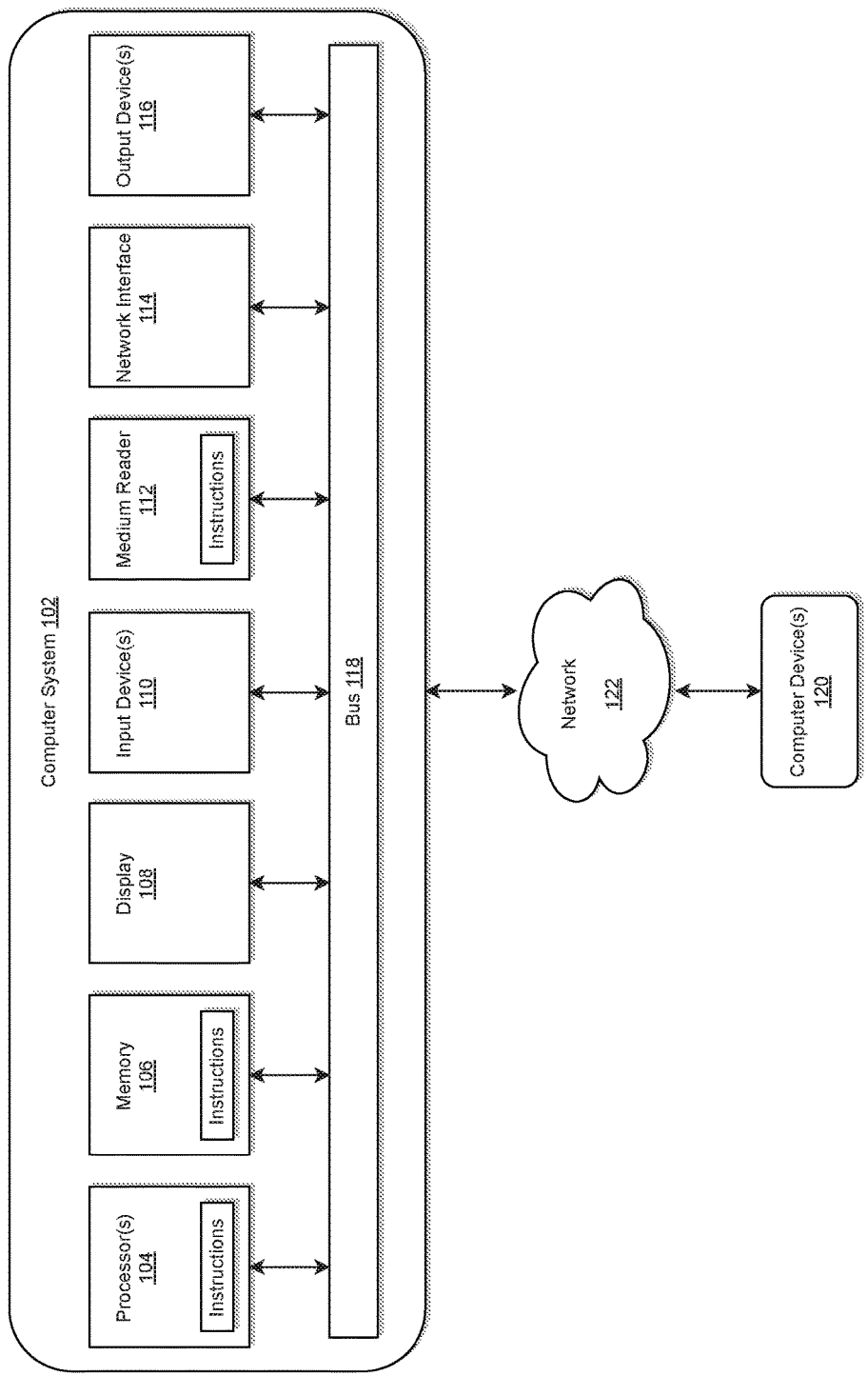
FIG. 1 illustrates a computer system for implementing a platform and language agnostic automated seeding processing module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic automation stack module (i.e., automated seeding processing module) configured to automatically manage a seeding process in accordance with the embodiments described herein. The seeding process may be a card services seeding process, but the disclosure is not limited thereto. The seeding process disclosed herein may be extended to any other transactions without departing from the scope of the present disclosure. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration based languages.

Figure 2:
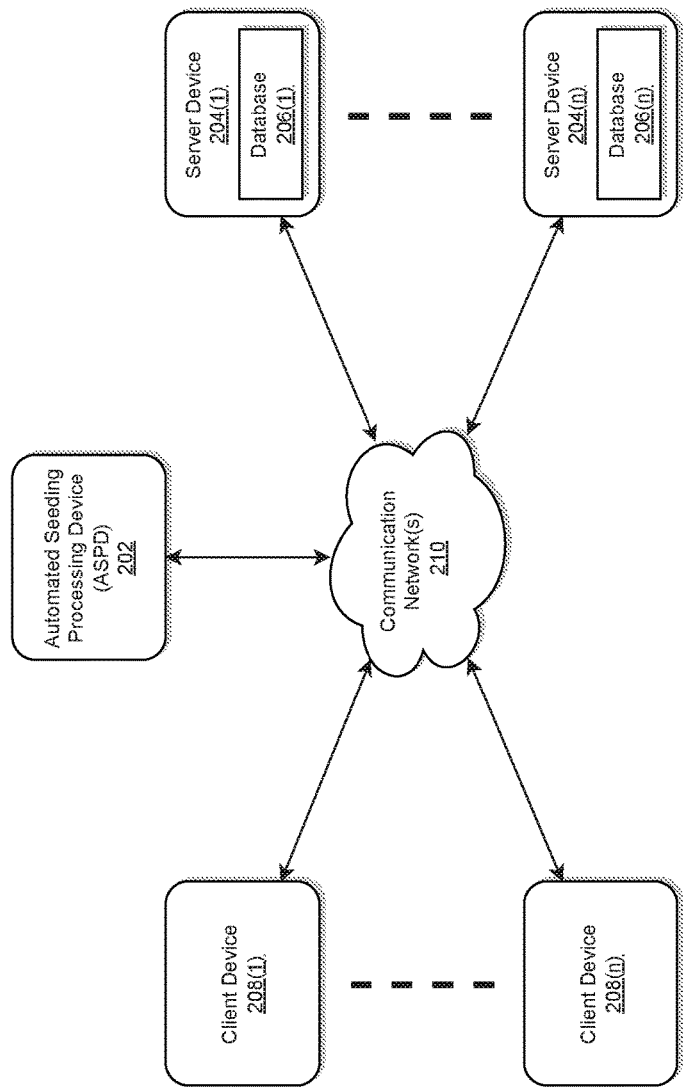
FIG. 2 illustrates an exemplary diagram of a network environment with a platform and language agnostic automated seeding processing device in accordance with an exemplary embodiment.

Referring to FIG. 2, a schematic of an exemplary network environment 200 for implementing a platform and language agnostic automated seeding processing device (ASPD) of the instant disclosure is illustrated.

According to exemplary embodiments, the above-described problems associated with conventional approach of seeding process may be overcome by implementing an ASPD 202 as illustrated in FIG. 2 that may implement a platform and language agnostic automated seeding processing module as disclosed herein configured to automatically manage a seeding process (i.e., a card services seeding process, but the disclosure is not limited thereto), thereby removing risk from the environment, meeting the technology requirements without having to accept risk with a non-supported software product; increasing capability by automating the process switch during planned or unplanned Site Switch & Recovery; and allowing the CPPLEX environment to meet any new data center entry criteria to move from the old data centers to new data centers on-time, but the disclosure is not limited thereto.

The ASPD 202 may be the same or similar to the computer system 102 as described with respect to FIG. 1.

The ASPD 202 may store one or more applications that can include executable instructions that, when executed by the ASPD 202, cause the ASPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASPD 202 itself, may be located in virtual server(s) running in a cloud-based computing environment rather than being tied to one or more specific physical network computing devices. Also, the application(s) may be running in one or more virtual machines (VMs) executing on the ASPD 202. Additionally, in one or more embodiments of this technology, virtual machine(s) running on the ASPD 202 may be managed or supervised by a hypervisor.

In the network environment 200 of FIG. 2, the ASPD 202 is coupled to a plurality of server devices 204(1)-204(n) that hosts a plurality of databases 206(1)-206(n), and also to a plurality of client devices 208(1)-208(n) via communication network(s) 210. A communication interface of the ASPD 202, such as the network interface 114 of the computer system 102 of FIG. 1, operatively couples and communicates between the ASPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASPD 202 may be a standalone device or integrated with one or more other devices or apparatuses, such as one or more of the server devices 204(1)-204(n), for example. In one particular example, the ASPD 202 may be hosted by one of the server devices 204(1)-204(n), and other arrangements are also possible. Moreover, one or more of the devices of the ASPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASPD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ASPD 202 that may efficiently provide a platform for implementing a platform and language agnostic automated seeding processing module as disclosed herein configured to automatically manage a seeding process (i.e., a card services seeding process, but the disclosure is not limited thereto), thereby removing risk from the environment, meeting the technology requirements without having to accept risk with a non-supported software product; increasing capability by automating the process switch during planned or unplanned Site Switch & Recovery; and allowing the CPPLEX environment to meet any new data center entry criteria to move from the old data centers to new data centers on-time, but the disclosure is not limited thereto.

The client devices 208(1)-208(n) may run interface applications, such as standard web browsers or standalone client applications, which may provide an interface to communicate with the ASPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASPD 202, the server devices 204(1)-204(n), or the client devices 208(1)-208(n), for example, may be configured to operate as virtual instances on the same physical machine. For example, one or more of the ASPD 202, the server devices 204(1)-204(n), or the client devices 208(1)-208(n) may operate on the same physical device rather than as separate devices communicating through communication network(s) 210. Additionally, there may be more or fewer ASPDs 202, server devices 204(1)-204(n), or client devices 208(1)-208(n) than illustrated in FIG. 2. According to exemplary embodiments, the ASPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
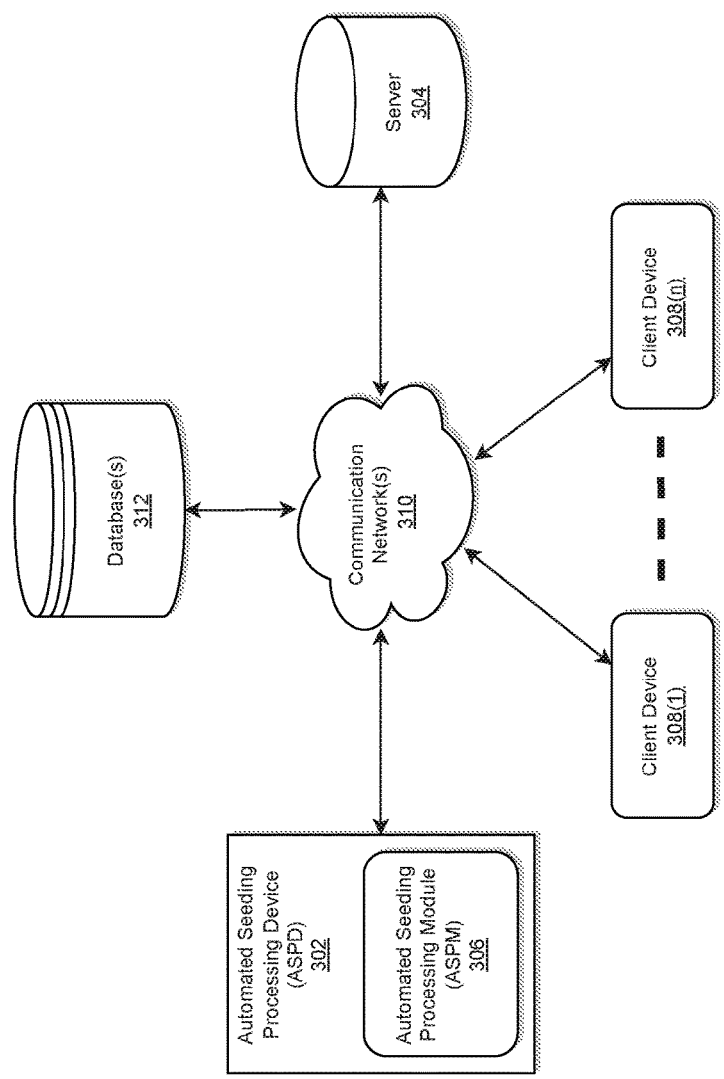
FIG. 3 illustrates a system diagram for implementing a platform and language agnostic automated seeding processing device having a platform and language agnostic automated seeding processing module in accordance with an exemplary embodiment.

FIG. 3 illustrates a system diagram for implementing a platform and language agnostic data processing device (ASPD) having a platform and language agnostic data processing module (ASPM) in accordance with an exemplary embodiment.

As illustrated in FIG. 3, the system 300 may include an ASPD 302 within which a ASPM 306 is embedded, a server 304, a database(s) 312, a plurality of client devices 308(1) . . . 308(n), and a communication network 310.

According to exemplary embodiments, the ASPD 302 including the ASPM 306 may be connected to the server 304, and the database(s) 312 via the communication network 310. The ASPD 302 may also be connected to the plurality of client devices 308(1) . . . 308(n) via the communication network 310, but the disclosure is not limited thereto.

According to exemplary embodiment, the ASPD 302 is described and shown in FIG. 3 as including the ASPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the ASPM 306 may be configured to receive real-time feed of data from the plurality of client devices 308(1) . . . 308(n) via the communication network 310.

As will be described below, the ASPM 306 may be configured to generate a table that includes parameters to be utilized for an automation process configured to automate a seeding process; trigger the automation process in response to running a batch process; identify one specific job that has been injected into the batch process during running the batch process; develop an execution command, in response to identifying the one specific job, that makes a call to a predefined algorithm written in a predefined programming language installed on an operating system; pass commands, in response to developing the execution command, by the predefined algorithm to a CSM via a network through a CSM API; transmit, by the CSM, a query data via a predefined formatted data to the predefined algorithm which sends the predefined formatted data back to the execution command as reformatted text, until the automation process is completed; and automatically detect which site the seeding process will execute from thereby maintaining the automation process on track, but the disclosure is not limited thereto.

The plurality of client devices 308(1) . . . 308(n) are illustrated as being in communication with the ASPD 302. In this regard, the plurality of client devices 308(1) . . . 308(n) may be "clients" of the ASPD 302 and are described herein as such. Nevertheless, it is to be known and understood that the plurality of client devices 308(1) . . . 308(n) need not necessarily be "clients" of the ASPD 302, or any entity described in association therewith herein. Any additional or alternative relationship may exist between either or both of the plurality of client devices 308(1) . . . 308(n) and the ASPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ASPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ASPD 302 may be the same or similar to the ASPD 202 as described with respect to FIG. 2, including any features or combination of features described with respect thereto.

Figure 4:
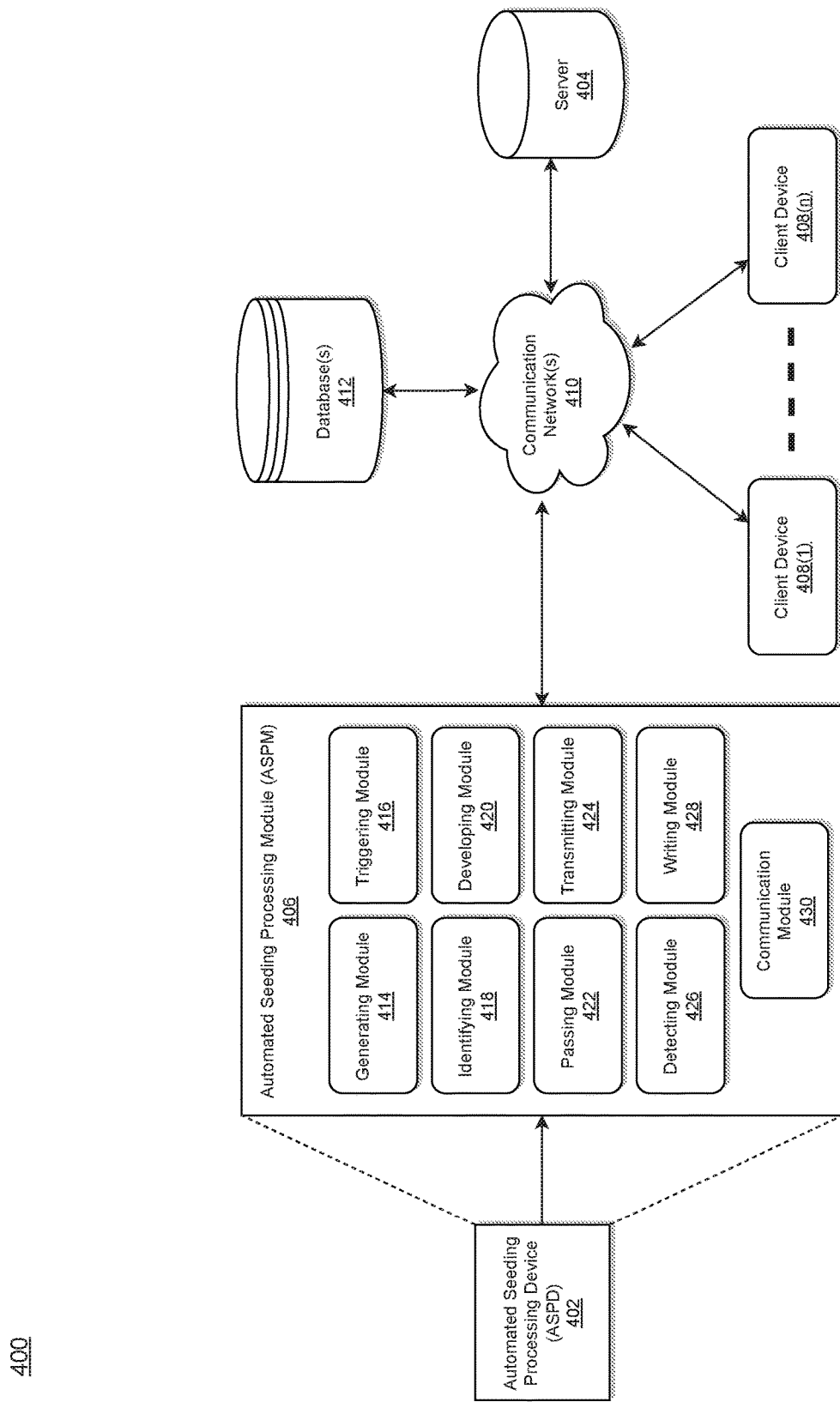
FIG. 4 illustrates a system diagram for implementing a platform and language agnostic automated seeding processing module of FIG. 3 in accordance with an exemplary embodiment.

FIG. 4 illustrates a system diagram for implementing a platform and language agnostic data processing module (ASPM) of FIG. 3 in accordance with an exemplary embodiment.

According to exemplary embodiments, the system 400 may include a platform and language agnostic data processing device (ASPD) 402 within which an ASPM 406 is embedded, a server 404, database(s) 412, and a communication network 410.

According to exemplary embodiments, the ASPD 402 including the ASPM 406 may be connected to the server 404 and the database(s) 412 via the communication network 410. The ASPD 402 may also be connected to the plurality of client devices 408(1)-408(n) via the communication network 410, but the disclosure is not limited thereto. The ASPM 406, the server 404, the plurality of client devices 408(1)-408(n), the database(s) 412, the communication network 410 as illustrated in FIG. 4 may be the same or similar to the ASPM 306, the server 304, the plurality of client devices 308(1)-308(n), the database(s) 312, the communication network 310, respectively, as illustrated in FIG. 3.

According to exemplary embodiments, as illustrated in FIG. 4, the ASPM 406 may include a generating module 414, a triggering module 416, an identifying module 418, a developing module 420, a passing module 422, a transmitting module 424, a detecting module 426, a writing module 428, and a communication module 430.

According to exemplary embodiments, each of the generating module 414, triggering module 416, identifying module 418, developing module 420, passing module 422, transmitting module 424, detecting module 426, writing module 428, and the communication module 430 of the ASPM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the generating module 414, triggering module 416, identifying module 418, developing module 420, passing module 422, transmitting module 424, detecting module 426, writing module 428, and the communication module 430 of the ASPM 406 may be implemented by microprocessors or similar, and may be programmed using software (e.g., microcode) to perform various functions discussed herein and may optionally be driven by firmware and/or software.

Alternatively, according to exemplary embodiments, each of the generating module 414, triggering module 416, identifying module 418, developing module 420, passing module 422, transmitting module 424, detecting module 426, writing module 428, and the communication module 430 of the ASPM 406 may be implemented by dedicated hardware, or as a combination of dedicated hardware to perform some functions and a processor (e.g., one or more programmed microprocessors and associated circuitry) to perform other functions.

According to exemplary embodiments, each of the generating module 414, triggering module 416, identifying module 418, developing module 420, passing module 422, transmitting module 424, detecting module 426, writing module 428, and the communication module 430 of the ASPM 406 may be called via corresponding API.

The process may be executed via the communication module 430 and the communication network 410, which may comprise plural networks as described above. For example, in an exemplary embodiment, the various components of the ASPM 406 may communicate with the server 404, and the database(s) 412 via the communication module 430 and the communication network 410. Of course, these embodiments are merely exemplary and are not limiting or exhaustive.

According to exemplary embodiments, the communication network 410 and the communication module 430 may be configured to establish a link between the database(s) 412, the client devices 408(1)-408(n) and the ASPM 406.

According to exemplary embodiments, the generating module 414 may be configured to generate a table that includes parameters to be utilized for an automation process configured to automate a seeding process. The table may include CA OPS/MVS jobs and table names. Parameters CA-OPS/MVS of the tables are used to negotiate the site values so that this process can be automated to co-exist with the current other site recovery procedures and practice strategies.

According to exemplary embodiments, the triggering module 416 may be configured to trigger the automation process in response to running a batch process.

According to exemplary embodiments, the identifying module 418 may be configured to identify one specific job that has been injected into the batch process during running the batch process.

According to exemplary embodiments, the developing module 420 may be configured to develop an execution command that makes a call to a predefined algorithm written in a predefined programming language installed on an operating system in response to identifying the one specific job.

According to exemplary embodiments, the passing module 422 may be configured to pass commands, in response to developing the execution command, by the predefined algorithm to a CSM via a network through a CSM API.

According to exemplary embodiments, the transmitting module 424 may be configured to transmit, by the CSM, a query data via a predefined formatted data to the predefined algorithm which sends the predefined formatted data back to the execution command as reformatted text, until the automation process is completed.

According to exemplary embodiments, the detecting module 426 may be configured to automatically detect which site the seeding process will execute from thereby maintaining the automation process on track.

According to exemplary embodiments, the writing module 428 may be configured to write the automation stack in REXX (Restructured Extended Executor) programming language and wherein the formatted data is JSON (Java Script Object Notation) formatted data but the disclosure is not limited thereto these specified languages.

According to exemplary embodiments, the execution command may be a 64-bit operating system for a predefined architecture mainframe (z/OS) REXX execution command and wherein the predefined algorithm is a Python routine but the disclosure is not limited thereto these specified languages.

According to exemplary embodiments, the table may be CA OPS/MVS table, and the REXX execution command may execute the following: providing values back to the OPS/MVS table; passing data to the Python routine on tasks to operate; and re-formatting the JSON data back to an operating system text so that the CA OPS/MVS can identify status of steps in the automation process.

According to exemplary embodiments, the Python routine provides an interface to the CSM API advanced functioning so that CSM can operate tasks as needed by the automation process; and send the JSON formatted data back to the REXX execution command to allow for query or validation operations to occur, thereby maintaining the automation process on track.

According to exemplary embodiments, the seeding process corresponds to card seeding process that sends a copy of IMS (Information Management System) transaction data corresponding to a card transaction to card service application's stand-in environment to keep it current in the event it has to take over transaction processing for production environment.

According to exemplary embodiments, the batch process is a mainframe batch process.

According to exemplary embodiments, the CSM API may provide an interface between the automation stack and CSM for replication and process management. The CSM API notably increases flexibility and stability of the process by removing technical requirements that previously including GDPS Control LPARs into the technology solution to run code. Code will now execute on the Production LPARs it serves, basically containerizing the process. This streamlines the process and removes extra weight in the solution as previously managed, e.g., large system definitions to manage.

According to exemplary embodiments, session management for replication can be managed via CSM API calls.

According to exemplary embodiments, the automation process implemented by the ASPM 406 may remove immediate risk from the environment; strengthens the process by using current, supported and advanced technology methods; increase the longevity of the process, allowing L.O.B (line of business) the flexibility to a solution of a software replication model in the long-term future via a database software replication solution; and increase capability by automating the process switch during planned or unplanned site switch and recovery, but the disclosure is not limited thereto.

Figure 5:
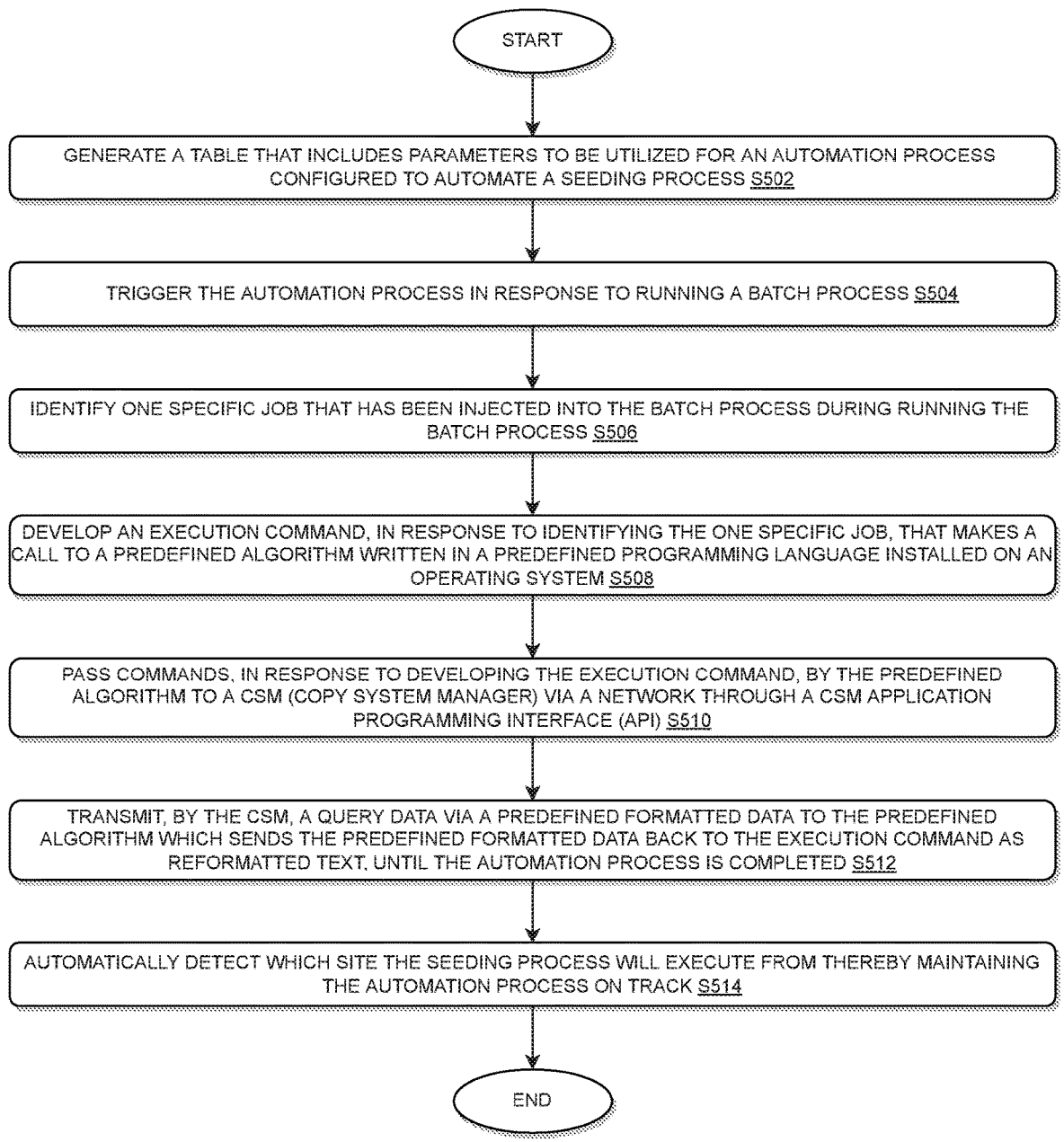
FIG. 5 illustrates a flow chart implemented by the platform and language agnostic automated seeding processing module of FIG. 4 in accordance with an exemplary embodiment.

FIG. 5 illustrates a flow chart 500 for automatically managing a seeding process as implemented by the ASPM 406 of FIG. 4 in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include generating a table that includes parameters to be utilized for an automation process configured to automate a seeding process.

At step S504, the process 500 may include triggering the automation process in response to running a batch process.

At step S506, the process 500 may include identifying one specific job that has been injected into the batch process during running the batch process.

At step S508, the process 500 may include developing an execution command that makes a call to a predefined algorithm written in a predefined programming language installed on an operating system in response to identifying the one specific job.

At step S510, the process 500 may include passing commands, in response to developing the execution command, by the predefined algorithm to a CSM via a network through a CSM API.

At step S512, the process 500 may include transmitting, by the CSM, a query data via a predefined formatted data to the predefined algorithm which sends the predefined formatted data back to the execution command as reformatted text, until the automation process is completed.

At step S514, the process 500 may include automatically detecting which site the seeding process will execute from thereby maintaining the automation process on track.

According to exemplary embodiments, the process 500 may further include: writing the automation stack in REXX programming language and wherein the formatted data is JSON formatted data but the disclosure is not limited thereto these specified languages.

According to exemplary embodiments, in the process 500, the execution command is a 64-bit operating system for a predefined architecture mainframe REXX execution command and wherein the predefined algorithm is a Python routine but the disclosure is not limited thereto these specified languages.

According to exemplary embodiments, the table may be an OPS/MVS table, and in the process 500, the REXX execution command may execute the following: providing values back to the OPS/MVS table; passing data to the Python routine on tasks to operate; and re-formatting the JSON data back to an operating system text so that the OPS/MVS can identify status of steps in the automation process.

According to exemplary embodiments, in the process 500, the Python routine provides an interface to the CSM API advanced functioning so that CSM can operate tasks as needed by the automation process; and send the JSON formatted data back to the REXX execution command to allow for query or validation operations to occur, thereby maintaining the automation process on track.

According to exemplary embodiments, in the process 500, the seeding process corresponds to card seeding process that sends a copy of IMS transaction data corresponding to a card transaction to card service application's stand-in environment to keep it current in the event it has to take over transaction processing for production environment.

According to exemplary embodiments, in the process 500, the batch process is a mainframe batch process.

According to exemplary embodiments, the ASPD 402 may include a memory (e.g., a memory 106 as illustrated in FIG. 1) which may be a non-transitory computer readable medium that may be configured to store instructions for implementing an ASPM 406 executes an automation stack to manage a seeding process as disclosed herein. The ASPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ASPM 406, 506 or within the ASPD 402, may be used to perform one or more of the methods and processes as described herein. In a particular embodiment, the instructions may reside completely, or at least partially, within the memory 106, the medium reader 112, and/or the processor 104 (see FIG. 1) during execution by the ASPD 402.

According to exemplary embodiments, the instructions, when executed, may cause a processor embedded within the ASPM 406 or the ASPD 402 to perform the following: generating a table that includes parameters to be utilized for an automation process configured to automate a seeding process; triggering the automation process in response to running a batch process; identifying one specific job that has been injected into the batch process during running the batch process; developing an execution command, in response to identifying the one specific job, that makes a call to a predefined algorithm written in a predefined programming language installed on an operating system; passing commands, in response to developing the execution command, by the predefined algorithm to a CSM via a network through a CSM API; transmitting, by the CSM, a query data via a predefined formatted data to the predefined algorithm which sends the predefined formatted data back to the execution command as reformatted text, until the automation process is completed; and automatically detecting which site the seeding process will execute from thereby maintaining the automation process on track. The processor may be the same or similar to the processor 104 as illustrated in FIG. 1 or the processor embedded within ASPD 202, ASPD 302, ASPD 402, and ASPM 406.

According to exemplary embodiments, the instructions, when executed, may further cause the processor 104 to perform the following: writing the automation stack in REXX programming language and wherein the formatted data is JSON formatted data.

According to exemplary embodiments, the table may be an OPS/MVS table, and the instructions may cause the REXX execution command to execute the following: providing values back to the OPS/MVS table; passing data to the Python routine on tasks to operate; and re-formatting the JSON data back to an operating system text so that the OPS/MVS can identify status of steps in the automation process.

According to exemplary embodiments as disclosed above in FIGS. 1-5, technical improvements effected by the instant disclosure may include a platform for implementing a platform and language agnostic automated seeding processing module as disclosed herein configured to automatically manage a seeding process (i.e., a card services seeding process, but the disclosure is not limited thereto), thereby removing risk from the environment, meeting the technology requirements without having to accept risk with a non-supported software product; increasing capability by automating the process switch during planned or unplanned Site Switch & Recovery; and allowing the CPPLEX environment to meet any new data center entry criteria to move from the old data centers to new data centers on-time, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automation stack to manage a seeding process by utilizing one or more processors along with allocated memory, the method comprising:
   generating a table that includes parameters to be utilized for an automation process configured to automate a seeding process;
   triggering the automation process in response to running a batch process;
   identifying one specific job that has been injected into the batch process during running the batch process;
   developing an execution command, in response to identifying the one specific job, that makes a call to a predefined algorithm written in a predefined programming language installed on an operating system;
   passing commands, in response to developing the execution command, by the predefined algorithm to a CSM (copy system manager) via a network through a CSM application programming interface (API), wherein the CSM is configured to operate tasks as needed by the automation process;
   transmitting, by the CSM, a query data via a predefined formatted data to the predefined algorithm which sends the predefined formatted data back to the execution command as reformatted text, until the automation process is completed;
   automatically detecting a server from which the seeding process will be executed; and
   writing the automation stack in REXX (Restructured Extended Executor) programming language and wherein the formatted data is JSON (Java Script Object Notation) formatted data,
   wherein the execution command is a 64-bit command executed in the operating system for a predefined architecture mainframe REXX execution command and wherein the predefined algorithm is a Python routine, and
   wherein the table is an OPS/MVS (operations/multiple virtual storage) table, and wherein the REXX execution command executes the following:
   providing values back to the OPS/MVS table;
   passing data to the Python routine on tasks to operate; and
   re-formatting the JSON data so that the OPS/MVS can identify status of steps in the automation process.

2. The method according to claim 1, wherein the Python routine provides an interface to the CSM API advanced functioning so that the CSM can operate tasks as needed by the automation process; and send the JSON formatted data back to the REXX execution command to allow for query or validation operations to occur, thereby maintaining the automation process on track.

3. The method according to claim 1, wherein the seeding process corresponds to card seeding process that sends a copy of IMS (Information Management System) transaction data corresponding to a card transaction to card service application's stand-in environment to keep it current in the event it has to take over transaction processing for production environment.

4. The method according to claim 1, wherein the batch process is a mainframe batch process.

5. A system for implementing an automation stack to manage a seeding process by utilizing one or more processors along with allocated memory, the system comprising:
   a processor; and
   a memory operatively connected to the processor via a communication interface, the memory storing computer readable instructions, when executed, causes the processor to:
   generate a table that includes parameters to be utilized for an automation process configured to automate a seeding process;
   trigger the automation process in response to running a batch process;
   identify one specific job that has been injected into the batch process during running the batch process;
   develop an execution command, in response to identifying the one specific job, that makes a call to a predefined algorithm written in a predefined programming language installed on an operating system;
   pass commands, in response to developing the execution command, by the predefined algorithm to a CSM (copy system manager) via a network through a CSM application programming interface (API);
   transmit, by the CSM, a query data via a predefined formatted data to the predefined algorithm which sends the predefined formatted data back to the execution command as reformatted text, until the automation process is completed;
   automatically detect which-a site server from which the seeding process will be executed; and
   write the automation stack in REXX (Restructured Extended Executor) programming language and wherein the formatted data is JSON (Java Script Object Notation) formatted data;
   wherein the execution command is a 64-bit command executed in the operating system for a predefined architecture mainframe REXX execution command and wherein the predefined algorithm is a Python routine, and
   wherein the table is an OPS/MVS (operations/multiple virtual storage) table, and wherein the processor causes the REXX execution command to execute the following:
   provide values back to the OPS/MVS table;
   pass data to the Python routine on tasks to operate; and
   re-format the JSON data so that the OPS/MVS can identify status of steps in the automation process.

6. The system according to claim 5, wherein the Python routine provides an interface to the CSM API advanced functioning so that the CSM can operate tasks as needed by the automation process; and send the JSON formatted data back to the REXX execution command to allow for query or validation operations to occur, thereby maintaining the automation process on track.

7. The system according to claim 5, wherein the seeding process corresponds to card seeding process that sends a copy of IMS (Information Management System) transaction data corresponding to a card transaction to card service application's stand-in environment to keep it current in the event it has to take over transaction processing for production environment.

8. The system according to claim 5, wherein the batch process is a mainframe batch process.

9. A non-transitory computer readable medium configured to store instructions for implementing an automation stack to manage a seeding process by utilizing one or more processors along with allocated memory, wherein, when executed, the instructions cause a processor to perform the following:
 generating a table that includes parameters to be utilized for an automation process configured to automate a seeding process;
 triggering the automation process in response to running a batch process;
 identifying one specific job that has been injected into the batch process during running the batch process;
 developing an execution command, in response to identifying the one specific job, that makes a call to a predefined algorithm written in a predefined programming language installed on an operating system;
 passing commands, in response to developing the execution command, by the predefined algorithm to a CSM (copy system manager) via a network through a CSM application programming interface (API);
 transmitting, by the CSM, a query data via a predefined formatted data to the predefined algorithm which sends the predefined formatted data back to the execution command as reformatted text, until the automation process is completed;
 automatically detecting a server from which the seeding process will be executed; and
 writing the automation stack in REXX (Restructured Extended Executor) programming language and wherein the formatted data is JSON (Java Script Object Notation) formatted data;
 wherein the execution command is a 64-bit command executed in the operating system for a predefined architecture mainframe REXX execution command and wherein the predefined algorithm is a Python routine, and
 wherein the table is an OPS/MVS (operations/multiple virtual storage) table, and wherein the instructions cause the REXX execution command to execute the following:
 providing values back to the OPS/MVS table;
 passing data to the Python routine on tasks to operate; and
 re-formatting the JSON data so that the OPS/MVS can identify status of steps in the automation process.

10. The non-transitory computer readable medium according to claim 9, wherein the Python routine provides an interface to the CSM API advanced functioning so that the CSM can operate tasks as needed by the automation process; and send the JSON formatted data back to the REXX execution command to allow for query or validation operations to occur, thereby maintaining the automation process on track.

11. The non-transitory computer readable medium according to claim 9, wherein the seeding process corresponds to card seeding process that sends a copy of IMS (Information Management System) transaction data corresponding to a card transaction to card service application's stand-in environment to keep it current in the event it has to take over transaction processing for production environment; and wherein the batch process is a mainframe batch process.

\* \* \* \* \*